United States Patent
Magee

(10) Patent No.: US 9,290,041 B2
(45) Date of Patent: Mar. 22, 2016

(54) STREAMLINED TAILFIN FOR BICYCLE WHEEL SPOKE

(71) Applicant: Garth L Magee, Hawthorne, CA (US)

(72) Inventor: Garth L Magee, Hawthorne, CA (US)

( * ) Notice: Subject to any disclaimer, the term of this patent is extended or adjusted under 35 U.S.C. 154(b) by 0 days.

(21) Appl. No.: 14/727,828

(22) Filed: Jun. 1, 2015

(65) Prior Publication Data

US 2015/0258849 A1     Sep. 17, 2015

Related U.S. Application Data

(62) Division of application No. 13/799,005, filed on Mar. 13, 2013.

(60) Provisional application No. 61/745,357, filed on Dec. 21, 2012.

(51) Int. Cl.

| | |
|---|---|
| *B60B 1/02* | (2006.01) |
| *B62D 35/00* | (2006.01) |
| *B60B 7/00* | (2006.01) |
| *B60C 11/03* | (2006.01) |
| *B60B 1/00* | (2006.01) |
| *B60B 1/04* | (2006.01) |
| *B60B 1/06* | (2006.01) |
| *B60B 3/08* | (2006.01) |
| *B60B 3/10* | (2006.01) |
| *B60C 11/11* | (2006.01) |
| *B60B 3/00* | (2006.01) |

(52) U.S. Cl.
CPC .............. *B60B 1/0246* (2013.01); *B60B 1/003* (2013.01); *B60B 1/02* (2013.01); *B60B 1/041* (2013.01); *B60B 1/06* (2013.01); *B60B 3/007* (2013.01); *B60B 3/08* (2013.01); *B60B 3/10* (2013.01); *B60B 7/0006* (2013.01); *B60B 7/0066* (2013.01); *B60C 11/0302* (2013.04); *B60C 11/0327* (2013.04); *B60C 11/11* (2013.01); *B62D 35/00* (2013.01); *B60B 3/00* (2013.01); *B60B 7/00* (2013.01); *B60B 2900/1216* (2013.01); *B60C 2011/0337* (2013.04); *B60Y 2200/13* (2013.01); *Y10T 29/49492* (2015.01)

(58) Field of Classification Search
CPC .... B60B 1/0246; B60B 1/003; B60B 1/0261; B60B 3/007; B60B 3/08; B60B 3/10; B60B 7/0006; B60B 7/0066; B60B 7/18; B62D 35/00; B62D 35/02
USPC ........ 280/152.2, 152.3, 288.4, 304.3; 301/55, 301/56, 57, 104
See application file for complete search history.

(56) References Cited

U.S. PATENT DOCUMENTS

| | | |
|---|---|---|
| 449,220 A | 3/1891 | Jeffrey |
| 622,997 A | 4/1899 | Diehl |
| 1,027,806 A | 5/1912 | Blake |
| 2,460,349 A | 7/1947 | Hessler |
| 3,101,163 A | 8/1963 | Huber |
| 3,579,408 A * | 5/1971 | Dowhan ................ B60B 7/0006 301/37.39 |
| 4,027,836 A | 6/1977 | Seibel |

(Continued)

OTHER PUBLICATIONS

Sunter & Sayers, Aerodynamic Drag Mountain Bike Tyres, Sports Engineering, 2001, 4, 63-73.

(Continued)

*Primary Examiner* — John Walters

(57) ABSTRACT

A streamlined tailfin rotatably attached to a bicycle wheel spoke reduces drag by swiveling as a wind vane in both headwinds and crosswinds.

14 Claims, 5 Drawing Sheets

(56) References Cited

U.S. PATENT DOCUMENTS

| | | | |
|---|---|---|---|
| 4,262,953 | A | 4/1981 | McErlane |
| 4,326,728 | A | 4/1982 | Tatch |
| 4,411,443 | A | 10/1983 | Pollard |
| 4,486,046 | A | 12/1984 | Whitney |
| 4,640,541 | A | 2/1987 | FitGerald |
| 4,773,663 | A | 9/1988 | Sawyer |
| 4,919,490 | A | 4/1990 | Hopkins |
| 4,930,844 | A | 6/1990 | Giroux |
| 5,061,013 | A | 10/1991 | Hed |
| D323,306 | S | 1/1992 | Brummer |
| 5,080,444 | A | 1/1992 | Hopkins |
| 5,246,275 | A | 9/1993 | Arredondo |
| 5,348,328 | A | 9/1994 | Millington |
| D377,158 | S | 1/1997 | Grimaldi |
| D396,441 | S | 7/1998 | Nishida |
| 5,779,323 | A | 7/1998 | Burrows |
| 6,017,076 | A | 1/2000 | Belisle |
| 6,086,161 | A * | 7/2000 | Luttgeharm ............ B60B 1/003 301/104 |
| D451,877 | S | 12/2001 | Lee |
| 6,325,462 | B1 | 12/2001 | Humel |
| D460,942 | S | 7/2002 | Lee |
| 6,446,994 | B1 | 9/2002 | Smerdon |
| D500,003 | S | 12/2004 | Guevara |
| 6,913,323 | B2 | 7/2005 | Bhambra |
| 6,974,178 | B2 | 12/2005 | Ortega |
| 7,322,592 | B2 | 1/2008 | Francis |
| 7,520,534 | B2 | 4/2009 | Longchamp |
| D612,781 | S | 3/2010 | Harrell |
| D634,249 | S | 3/2011 | Dallaire |
| 7,997,640 | B1 | 8/2011 | Wurm |
| D673,494 | S | 1/2013 | Lemke |
| 2007/0151644 | A1 | 7/2007 | Matthews |
| 2008/0296962 | A1 * | 12/2008 | Tsai ....................... B60B 1/003 301/104 |
| 2009/0236902 | A1 | 9/2009 | Zibkoff |
| 2010/0066123 | A1 | 3/2010 | Ortega |
| 2010/0327625 | A1 | 12/2010 | Tavlarides |
| 2011/0080019 | A1 | 4/2011 | Castillo |

OTHER PUBLICATIONS

Kyle, Aerodynamic Wheels, Bicycling, Dec. 1985, 121-124.
Greenwell, Aerodynamic characteristics of low-drag bicycle wheels, Aeronautical Journal, 1995, 99, 109-120.
Moore, Translational and rotational aerodynamic drag . . . , Proc. of Inst. of Mech. Engrs, Part P: Jml of Sports Eng., Jun. 1, 2008, V222, 2 ,91-102.
Forrester, On the Aerodynamics of Bicycle Wheels, School of Eng. Sciences, Univ. of Southhampton, UK, Jan. 2, 2008.
Kyle, Improving the Racing Bicycle, Mechanical Engineering, Sep. 1984, 106 (9), 35-45.
Kyle, Aerodynamics of human-powered vehicles, Proc. of Inst. Mech. Eng., 2004, V218, Part A, 141-154.
Gross, The Aerodynamics of Human-powered Land Vehicles, Scientific American,1983, 249 (6), 126-134.
Lukes, The understanding and development of cycling aerodynamics, Sports Engineering (2005) 8, 59-74.
Godo, An Aerodynamic Study of Bicycle Wheel Performance using CFD, AIAA Aerospace Science Mtg, 2009-322, Jan. 5-8, 2009.
Zdrakovich, Aerodynamics of bicycle wheel and frame, Jml of Wind Eng. & Industrial Aerodynamics, 40 (1992) 55-70.
Howard, Selection of Bicycle Wheel Type, The UMAP Journal, 22.3 (2001).

* cited by examiner

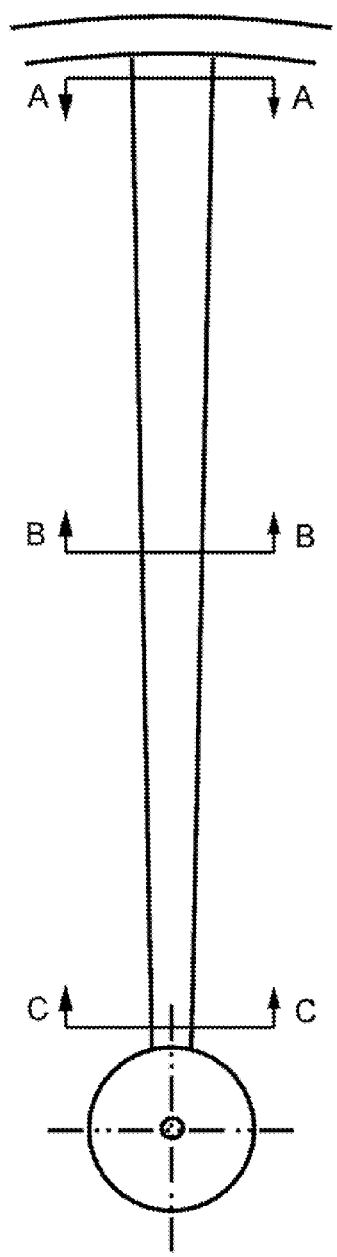
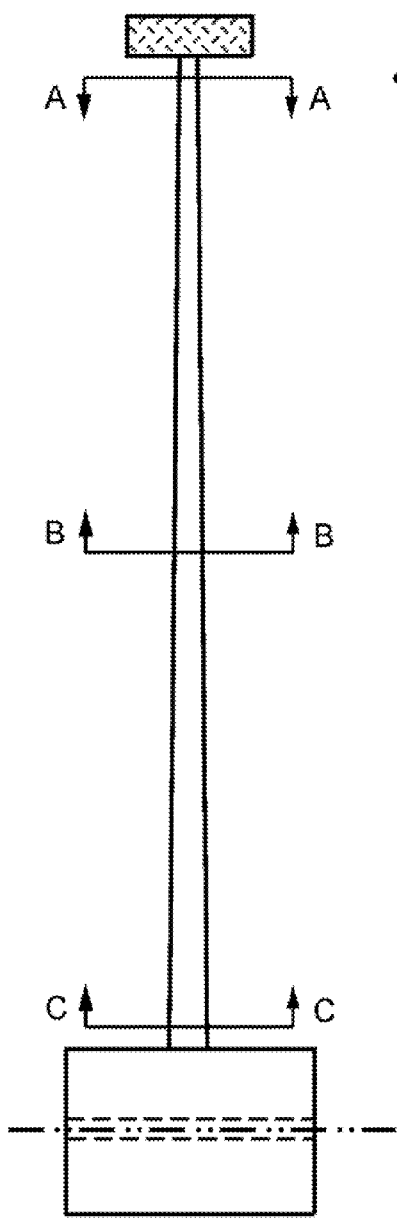
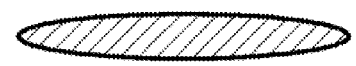
FIG. 6
FIG. 7
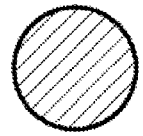
FIG. 8
FIG. 4   FIG. 5

-Reference Art-

-Prior Art-

STREAMLINED TAILFIN FOR BICYCLE WHEEL SPOKE

CROSS-REFERENCE TO RELATED APPLICATION

This is a division of application Ser. No. 13/799,005, filed Mar. 13, 2013, currently pending, by the present inventor.

BACKGROUND

1. Field

The present embodiment relates to vehicle wheels, and particularly to shields and devices used to reduce drag on rotating vehicle wheels.

2. Description of Prior Art

Inherently characteristic of rotating vehicle wheels, and particularly of spoked wheels, aerodynamic resistance, or parasitic drag, is an unwanted source of energy loss in propelling a vehicle. Parasitic drag on a wheel includes viscous drag components of form (or pressure) drag and frictional drag. Form drag on a wheel generally arises from the circular profile of a wheel moving though air at the velocity of the vehicle. The displacement of air around a moving object creates a difference in pressure between the forward and trailing surfaces, resulting in a drag force that is highly dependent on the relative wind speed acting thereon. Streamlining the wheel surfaces can reduce the pressure differential, reducing form drag.

Frictional drag forces also depend on the speed of wind impinging exposed surfaces, and arise from the contact of air moving over surfaces. Both of these types of drag forces arise generally in proportion to the square of the relative wind speed, per the drag equation. Streamlined design profiles are generally employed to reduce both of these components of drag force.

The unique geometry of a wheel used on a vehicle includes motion both in translation and in rotation; the entire circular outline of the wheel translates at the vehicle speed, and the wheel rotates about the axle at a rate consistent with the vehicle speed. Form drag forces arising from the moving outline are apparent, as the translational motion of the wheel rim must displace air immediately in front of the wheel (and replace air immediately behind it). These form drag forces arising across the entire vertical profile of the wheel are therefore generally related to the velocity of the vehicle.

As the forward profile of a wheel facing the direction of vehicle motion is generally symmetric in shape, and as the circular outline of a wheel rim moves forward at the speed of the vehicle, these form drag forces are often considered uniformly distributed across the entire forward facing profile of a moving wheel (although streamlined cycle rims can affect this distribution somewhat). This uniform distribution of pressure force is generally considered centered on the forward vertical wheel profile, and thereby in direct opposition to the propulsive force applied at the axle, as illustrated in FIG. 12.

However, as will be shown, frictional drag forces are not uniformly distributed with elevation on the wheel, as they are not uniformly related to the speed of the moving outline of the wheel rim. Instead, frictional drag forces on the wheel surfaces are highly variable and depend on their elevation above the ground. Frictional drag must be considered separate from form drag forces, and can be more significant sources of overall drag on the wheel and, as will be shown, thereby on the vehicle.

The motion of wheel spokes through air creates considerable drag, especially at higher relative wind speeds. This energy loss is particularly critical in both bicycle locomotion and in high-speed vehicle locomotion. Previous efforts to reduce this energy loss in bicycle wheels have included bladed-spoke designs; the addition of various coverings attached directly to the wheel; and the use of deeper, stiffer, and heavier aerodynamic rims. As winds, and particularly headwinds, are a principal source of energy loss in bicycle locomotion, expensive aerodynamic wheel designs have become increasingly popular. However, these aerodynamic wheel designs have often been tuned to reduce form drag, rather than frictional drag. As a result, augmented frictional drag forces present on these larger-surfaced aerodynamic wheel designs tend to offset much of the gains from reduced form drag forces, thereby negating potential reductions in overall drag.

Bladed spokes, tapered in the direction of motion through the wind, are designed to reduce form drag. These streamlined spokes suffer from increased design complexity, increased weight and higher costs. In addition, such bladed designs are more susceptible to crosswind drag effects: The increased surface area of the bladed spoke can rapidly increase form drag in the presence of any crosswind; any crosswind directed upon the flat portion of the spoke quickly increases pressure drag upon the spoke.

Under low crosswinds, the bladed spoke presents a relatively small forward profile facing oncoming headwinds, minimizing form drag. Indeed, the thin profile of the blade generally minimizes form drag over that of round spoke profile. However, most external winds will not be precisely aligned co-directional with the forward motion of the wheel. Such winds cause a crosswind component to be exerted upon the wheel, leading to flow-separation—and thus turbulence—behind the bladed spoke, and thereby generally negate the potential aerodynamic benefit of the bladed-spoke design. Under high crosswinds, the round spoke profile may even outperform the bladed spoke in terms of drag reduction. Perhaps a result of these conflicting factors, the bladed spoke has not become the common standard for use in all bicycle competitions.

Wheel covers generally include a smooth covering material attached directly to the wheel over the outside of the spokes, generally covering a large portion of the wheel assembly, often extending from the wheel rim to the axle. Wheel covers add weight to the wheel assembly and can result in more wheel surface area being exposed to winds. The additional weight on the wheel is detrimental to wheel acceleration, while the large surface area of the cover can increase frictional drag. Although covering the wheel spokes can reduce form drag forces thereon, the increased frictional drag forces on the larger surface areas can largely offset any aerodynamic benefit. In addition, covering large portions of the wheel also increases bicycle susceptibility to crosswind forces, destabilizing the rider. For this reason, wheel covers are generally used only on the rear wheel of a bicycle, and generally only under low crosswind conditions. Perhaps as a result of these conflicting factors, wheel covers have not become the standard equipment for use in all bicycle competitions.

Recently developed for use on bicycles, deeper, stiffer and heavier aerodynamic wheel rims suffer several drawbacks: deeper (wider along the radial direction of the wheel) and streamlined rims are often used to reduce profile drag on high-performance bicycle wheels. As mentioned, these rims are generally designed to reduce profile drag under various crosswind conditions. However, these deeper rims—having generally larger rotating surface areas—can dramatically increase friction drag. As will be shown, friction drag is particularly increased on the expanded upper wheel surfaces, largely negating any potential benefit of the reduced profile drag. In addition, such deep wheel rims with minimal spokes must be made stronger and stiffer—typically with double-wall construction—than conventional single-wall, thin-rim designs. As a result, such deep rims often ride more harshly over bumpy terrain, and are generally heavier, adding weight to the bicycle, which becomes a drawback when the grade becomes even slightly uphill.

As a result of these and other countervailing factors, no single wheel design has emerged as the preferred choice for reducing drag on bicycle wheels over a wide range of operating conditions. Instead, a variety of wheel designs are often employed in modern racing bicycles. In the same competition, for example, some riders may choose to use bladed spokes, while others choose round spokes, while still others choose deep rims or wheel covers. The differences in performance between these various wheel designs appear to only marginal affect the outcome of most races.

Spoke art includes many examples having rectangular or otherwise non-aerodynamic cross-sectional profiles of wheel spokes for use in automotive applications. Examples include patents U.S. D460,942, U.S. D451,877, U.S. D673,494, U.S. D396,441 and others.

Cycle spoke art includes a tapered spoke of U.S. Pat. No. 5,779,323 where the cross-sectional profile of the spoke changes from more highly elliptical near the wheel hub to more generally oval near the wheel rim. As will be shown, the spoke shown is tapered to minimize—rather than maximize—any aerodynamic benefit, especially when used in the presence of crosswinds.

SUMMARY

An embodiment comprises a streamlined tailfin rotatably attached to a wheel spoke, able to pivot about the spoke in response to varying crosswind conditions, thereby reducing potential turbulent flow separation behind the spoke and tailfin due to crosswinds, and thereby reducing the total drag-induced resistive forces upon the wheel assembly and minimizing needed vehicle propulsive counter-forces.

DESCRIPTION OF THE DRAWINGS

While one or more aspects pertain to most wheeled vehicles not otherwise having fully shielded wheels that are completely protected from oncoming headwinds, the embodiments can be best understood by referring to the following figures.

FIG. 4 shows a tapered spoke for use on a typical racing bicycle wheel. The spoke is shown tapering from a highly elliptical cross-sectional profile located nearest the wheel rim—shown at the top of the figure—to a more circular cross-sectional profile located on the spoke nearest the wheel central hub—shown at the bottom of the figure.

FIG. 5 shows a side view of the tapered spoke of FIG. 4.

FIG. 6 shows the highly elliptical cross section A-A of the tapered spoke shown in FIGS. 4 and 5.

FIG. 7 shows the more oval cross section B-B of the tapered spoke shown in FIGS. 4 and 5.

FIG. 8 shows the near circular cross section C-C of the tapered spoke shown in FIGS. 4 and 5.

DETAILED DESCRIPTION

A reference embodiment from a parent application is first described in detail in order to present an operational description of how drag reduction specifically on the upper wheel surfaces dramatically improves vehicle propulsion. Through similar means, the drag reduction on the upper wheel surfaces provided by the embodiment of this application similarly improves vehicle propulsion under a variety of wind conditions.

Reference Embodiment

Figure 9:
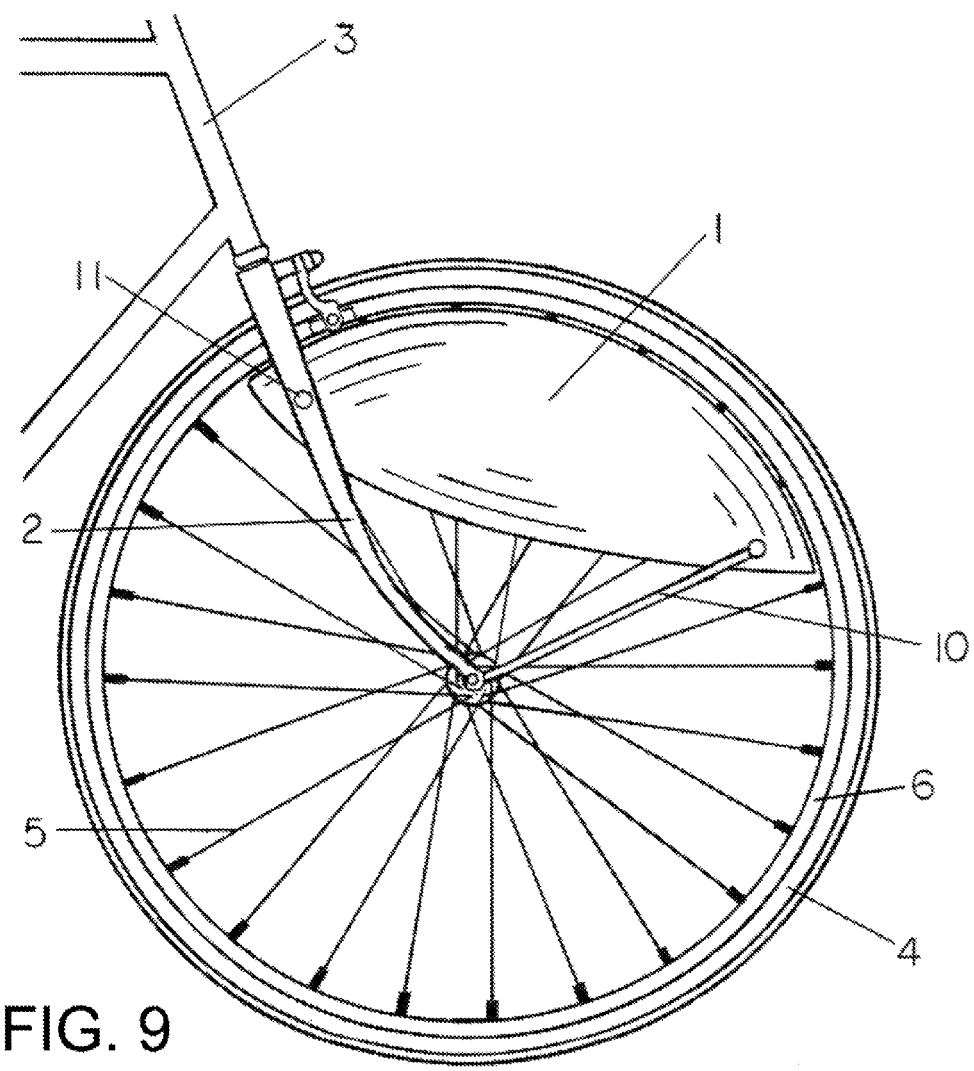
FIG. 9 is a front cycle wheel assembly, as typically found on a bicycle or motorcycle, where a fairing is attached and positioned as shown to each interior side of the fork assembly, thereby shielding the upper- and front-most surfaces of the spoked wheel from oncoming headwinds.
Figure 10:
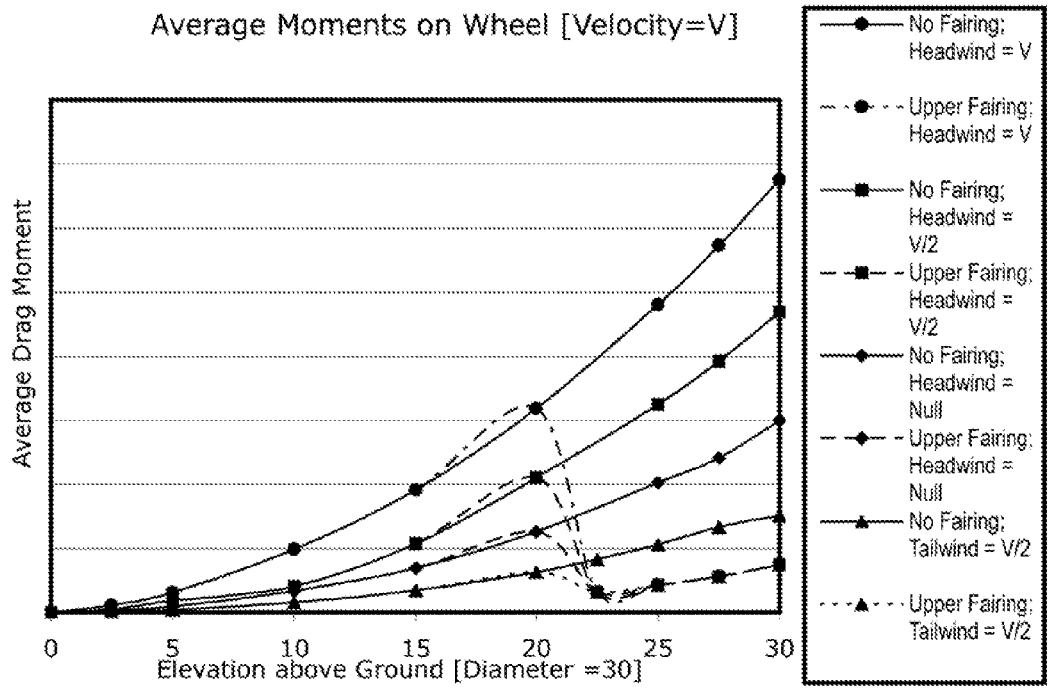
FIG. 10 shows a plot of calculated average moments—about the ground contact point —of drag force, that are exerted upon rotating wheel surfaces as a function of the elevation above the ground. The relative drag forces are determined from calculated wind vectors for the rotating surfaces on a wheel moving at a constant speed of V, and plotted for several different wind and wheel-surface shielding conditions. Specifically, relative magnitudes in average drag moments about the ground contact point as a function of elevation are plotted, for eight conditions: comparing with (dashed lines) and without (solid lines) shielding covering the upper third of wheel surfaces, for tailwinds equal to half the vehicle speed, for null headwinds, for headwinds equal to half the vehicle speed, and for headwinds equal to the vehicle speed. The rising solid curves plotted show the highest moments to be near the top of the wheel, while the dashed curves show the effect of the upper shield in substantially reducing the average drag moments on the rotating wheel.

Description—FIG. 9

As shown in FIG. 9, a streamlined fairing 1 is attached to the inside of a front fork tube assembly 2 of a typical bicycle 3 having spoked wheels 4. The fairing 1 is positioned closely adjacent to the inside structure of wheel 4, covering much of the upper and front-most quadrant of the wheel 4 as shown, and is rigidly fixed to front-fork tube assembly 2 using fastener 11 and strut 10. While only one fairing 1 is shown, the embodiment will generally include a similar fairing 1 located on the opposite side of the wheel 4, thereby shielding the entire upper inner structure of wheel 4 from the oncoming wind caused by forward motion of cycle 3. The fairing 1 has sufficient structural rigidity to allow close placement to spokes 5 and rim 6 of the wheel 4, thereby minimizing oncoming wind from leaking into the inner structure of wheel 4.

With fairing 1 configured in this way, the spokes 5 positioned near the top of the wheel 4 are shielded from headwinds. Shielded in this way, the topmost spokes 5 are moving at an effective wind speed generally less than or equal to the ground speed of the cycle 3, rather than moving at an effective headwind speed of up to nearly twice the ground speed of cycle 3. As a result, the aerodynamic drag forces exerted upon the topmost spokes 5 are greatly reduced.

The reduction in drag force due to fairing 1 is generally greater near the top of the wheel 4, where the spokes 5 are moving fastest with respect to headwinds otherwise impinging thereupon. As uppermost spokes 5 rotate away from the topmost point to an intermediate position with respect to either of the two lateral mid-points at the height of the axle on the wheel 4, these headwind drag forces are greatly reduced.

The embodiment shown in FIG. 9 includes a minimal fairing 1 positioned closely adjacent to the wheel, and shielding generally the most critical upper and forward-oriented quadrant of wheel 4, minimizing the addition of unnecessary weight or drag-inducing structure to cycle 3. The fairing 1 shown extends sufficiently rearward to provide a measure of profile shielding of the rear portion of the wheel and spokes, diverting the wind from impinging directly the rear rim of the wheel, and thereby permitting a generally streamlined flow to be maintained across the entire upper section of wheel assembly.

Reference Embodiment

Operation—FIGS. 9, 10, 11, 12 and 13

The shielding provided by fairing 1 is particularly effective since aerodynamic forces exerted upon exposed vehicle surfaces are generally proportional to the square of the effective wind speed impinging thereon. Moreover, the power required to overcome these drag forces is generally proportional to the cube of the effective wind speed. Thus, it can be shown that the additional power required to overcome these drag forces in propelling a vehicle twice as fast over a fixed distance, in half the time, increases by a factor of eight. And since this power requirement is analogous to rider effort—in the case of a bicycle rider—it becomes critical to shield the most critical drag-inducing surfaces on a vehicle from oncoming headwinds.

In any wheel used on a vehicle, and in the absence of any external headwinds, the effective horizontal wind speed at a point on the wheel at the height of the axle is equal to the ground speed of the vehicle. Indeed, the effective headwind speed upon any point of the rotating wheel depends on that point's current position with respect to the direction of motion of the vehicle.

Notably, a point on the moving wheel coming into direct contact with the ground is necessarily momentarily stationary, and therefore is not exposed to any relative wind speed, regardless of the speed of the vehicle. While the ground contact point can be rotating, it is not translating; the contact point is effectively stationary. And points on the wheel nearest the ground contact point are translating with only minimal forward speed. Hence, drag upon the surfaces of the wheel nearest the ground is generally negligible.

Contrarily, the topmost point of the wheel assembly (opposite the ground) is exposed to the highest relative wind speeds: generally at least twice that of the vehicle speed. And points nearest the top of the wheel are translating with forward speeds substantially exceeding the vehicle speed. Thus, drag upon the surfaces of the upper wheel can be quite substantial. Lower points on the wheel are exposed to lesser effective wind speeds, approaching a null effective wind speed—and thus negligible drag—for points nearest the ground.

Figure 12:
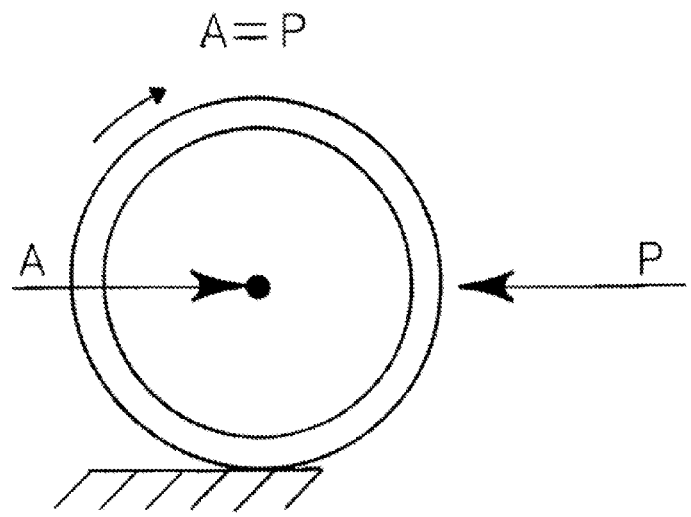
FIG. 12 is a diagram of a wheel rolling on the ground representing typical prior art models, showing the net pressure drag force (P) exerted upon the forward wheel vertical profile—which moves at the speed of the vehicle—being generally centered near the axle of the wheel and balanced against the propulsive force (A) applied at the axle.
Figure 13:
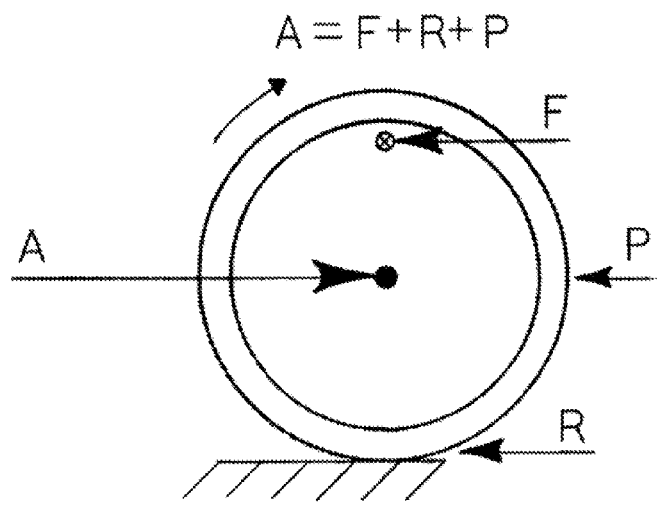
FIG. 13 is a diagram of a wheel rolling on the ground, showing the net friction drag force (F) upon the wheel surfaces—which move at different speeds depending on the elevation from the ground—being offset from the axle and generally centered near the top of the wheel. A ground reaction force (R)—arising due to the drag force being offset near the top of the wheel—is also shown. The force (A) applied at the axle needed to overcome the combination of drag forces (F+P) and reaction force (R) is also shown.

Importantly, due to the rotating geometry of the wheel, it can be shown that the effective combined frictional drag force exerted upon the wheel is typically centered in closer proximity to the top of the wheel, rather than centered closer to the axle as has been commonly assumed in many past analyses of total wheel drag forces. While the net pressure (or form) drag (P) force on the forwardly facing profile of the wheel is generally centered with elevation and directed near the axle on the wheel (as shown in FIG. 12), the net frictional drag force (F) upon the moving surfaces is generally offset to near the top of the wheel (as shown in FIG. 13).

Indeed, it is near the top of the wheel where the relative winds are both greatest in magnitude, and are generally oriented most directly opposed to the forward motion of rotating wheel surfaces. Moreover, in the absence of substantial external headwinds, the frictional drag exerted upon the lower wheel surfaces contributes relatively little to the net drag upon the wheel, especially when compared to the drag upon the upper surfaces. The combined horizontal drag forces (from pressure drag from headwinds deflected by both the leading and trailing wheel forwardly facing profiles, and from frictional drag from headwinds impinging upon the forwardly moving surfaces) are thus generally concentrated near the top of the wheel under typical operating conditions. Moreover, with the faster relative winds being directed against the uppermost wheel surfaces, total drag forces combine near the top to exert considerable retarding torque upon the wheel.

As mentioned, the horizontal drag forces are primarily due to both pressure drag forces generally distributed symmetrically across the forwardly facing vertical profiles of the wheel, and to winds in frictional contact with moving surfaces of the wheel. Pressure drag forces arise primarily from the displacement of air from around the advancing vertical profile of the wheel, whose circular outline moves at the speed at the vehicle. As discussed above, since the entire circular profile moves uniformly at the vehicle speed, the displacement of air from around the moving circular profile is generally uniformly distributed with elevation across the forwardly facing vertical profile of the wheel. Thus, these pressure drag forces (P, as shown in FIG. 12 and FIG. 13) are also generally evenly distributed with elevation across the entire forwardly facing vertical profile of the wheel, and centered near the axle. And these evenly distributed pressure drag forces arise generally in proportion only to the effective headwind speed of the vehicle.

Frictional drag forces (F, as shown FIG. 13), however, are concentrated near the top of the wheel where moving surfaces generally exceed vehicle speed—while the lower wheel surfaces move at less than the vehicle speed. Since drag forces are generally proportional to the square of the effective wind speed, it becomes apparent that with increasing wind speed, that these upper wheel frictional drag forces directed upon the moving surfaces increase much more rapidly than do pressure drag forces directed upon the forward profile of the wheel. Indeed, these friction drag forces generally arise in much greater proportion to an increasing effective headwind speed of the vehicle. Nevertheless, these increased frictional drag forces being directed on the upper wheel is only a partial factor contributing to augmented wheel drag forces being responsible for significantly retarded vehicle motion.

Significantly, both types of drag forces can be shown to exert moments of force pivoting about the point of ground contact. And as such, either type of drag force exerted upon the upper wheel retards vehicle motion considerably more than a similar force exerted upon a substantially lower surface of the wheel. Minimizing these upper wheel drag forces is therefore critical to improving propulsive efficiency of the vehicle.

Also important—and due to the rotating geometry of the wheel—it can be shown that the vehicle propulsive force on the wheel applied horizontally at the axle must substantially exceed the net opposing drag force exerted near the top of the wheel. These forces on a wheel are actually leveraged against each other, both pivoting about the same point—the point on the wheel which is in stationary contact with the ground—and which is constantly changing lateral position with wheel rotation. Indeed, with the geometry of a rolling wheel momentarily pivoting about the stationary point of ground contact, the lateral drag and propulsive forces each exert opposing moments of force on the wheel centered about this same point in contact with the ground.

Furthermore, unless the wheel is accelerating, the net torque from these combined moments on the wheel must be null: The propulsive moment generated on the wheel from the applied force at the axle must substantially equal the opposing moment from drag forces centered near the top of the wheel (absent other resistive forces, such as bearing friction, etc.). And the propulsive moment generated from the applied force at the axle has a much shorter moment arm (equal to the wheel radius) than the opposing moment from the net drag force centered near the top of the wheel (with a moment arm substantially exceeding the wheel radius)—since both moment arms are pivoting about the same stationary ground contact point. Thus, for these opposing moments to precisely counterbalance each other, the propulsive force applied at the axle—with the shorter moment arm—must substantially exceed the net drag force near the top of the wheel.

In this way, the horizontal drag forces exerted upon the upper surfaces of the wheel are leveraged against opposing and substantially magnified forces at the axle. Hence, a relatively small frictional drag force centered near the top of the wheel can have a relatively high impact on the propulsive counterforce required at the axle. Shielding these upper wheel surfaces can divert much of these headwind-induced drag forces directly onto the vehicle body, thereby negating much of the retarding force amplification effects due to the pivoting wheel geometry.

Moreover, since the propulsive force applied at the axle exceeds the combined upper wheel drag forces, a lateral reaction force (R, as shown in FIG. 13) upon the wheel is necessarily developed at the ground contact point, countering the combined unbalanced propulsive and drag forces on the wheel: Unless the wheel is accelerating, the reaction force at the ground, together with the upper wheel net drag forces (F+P), combine (A=F+R+P, as shown in FIG. 13) to countervail the lateral propulsive force (A) applied at the axle. This reaction force is transmitted to the wheel through frictional contact with the ground. In this way, an upper wheel drag force is further magnified against the axle. For these multiple reasons, it becomes crucial to shield the upper wheel surfaces from exposure to headwinds.

Given that the propulsive force (A) applied at the axle must overcome both the net wheel drag forces (F+P) and the countervailing lower reaction force (R) transmitted through the ground contact point, it can be shown that the net drag force upon the upper wheel can oppose vehicle motion with nearly twice the sensitivity as an equivalent drag force upon the static frame of the vehicle. Hence, shifting the impact of upper wheel drag forces to the static frame can significantly improve the propulsive efficiency of the vehicle.

Furthermore, as drag forces generally increase in proportion to the square of the effective wind speed, the more highly sensitive upper wheel drag forces increase far more rapidly with increasing headwind speeds than do vehicle frame drag forces. Thus, as the vehicle speed increases, upper wheel drag forces rapidly become an increasing component of the total drag forces retarding vehicle motion.

And given the greater sensitivity of speed-dependent upper wheel drag forces—as compared against vehicle frame drag forces—to the retarding of vehicle motion, considerable effort should first be given to minimizing upper wheel drag forces. And shielding the faster-moving uppermost surfaces of the wheel assembly from oncoming headwinds, by using the smallest effective fairing assembly, is an effective means to minimize upper wheel drag forces.

Contrarily, drag forces on the lower wheel generally oppose vehicle motion with reduced sensitivity compared to equivalent drag forces on the static frame of the vehicle. Propulsive forces applied at the axle are levered against lower wheel drag forces, magnifying their impact against these lower wheel forces. Shielding lower wheel surfaces can generally negate this mechanical advantage, and can actually increase overall drag on the vehicle.

Moreover, as discussed above, headwinds on the static frame generally exceed the speed of winds impinging the lower surfaces of the wheel. Hence, frictional drag forces on the lower wheel surfaces are greatly reduced. Thus, it is generally counterproductive to shield the wheel below the level of the axle. Drag on a vehicle is generally minimized with upper wheel surfaces shielded from headwinds and with lower wheel surfaces exposed to headwinds.

Wheel drag sensitivity to retarding vehicle motion becomes even more significant in the presence of external headwinds. With external headwinds, the effective wind speed impinging the critical upper wheel surfaces can well exceed twice the vehicle speed. Shielding protects the upper wheel surfaces both from external headwinds, and from headwinds due solely to vehicle motion.

Indeed, wheel surfaces covered by the shield are exposed to winds due solely to wheel rotation; headwinds are deflected. The effective drag winds beneath the shield are generally directed tangentially to rotating wheel surfaces, and vary in proportion to radial distance from the axle, reaching a maximum speed at the wheel rim equal to the vehicle speed, regardless of external headwinds. Since drag forces vary generally in proportion to the square of the wind speed, the frictional drag forces are considerably reduced on shielded upper wheel surfaces. Using these wind shields, shielded wheel surfaces are exposed to substantially reduced effective wind speeds—and to generally much less than half of the drag forces without shielding.

Diminished drag forces from external headwinds impinging the slower moving lower surfaces of a rolling wheel generally oppose wheel motion with much less retarding torque than drag forces from winds impinging the faster upper surfaces. Indeed, tests demonstrate that with upper shields installed on a suspended bicycle wheel, the wheel will spin naturally in the forward direction when exposed to headwinds. Without the shields installed, the same wheel remains stationary when exposed to headwinds, regardless of the speed of the headwind. And an unshielded spinning wheel will tend to stop spinning when suddenly exposed to a headwind. This simple test offers an explanation for the unexpected result achieved from Greenwell—mentioned above—and demonstrates that by minimally shielding only the upper wheel surfaces from external headwinds, the overall drag upon the rotating wheel can be substantially reduced.

Furthermore, as external headwinds upon a forwardly rotating vehicle wheel add relatively little frictional drag to the lower wheel surfaces—which move forward at less than the vehicle speed—but add far more significant drag to the upper wheel surfaces, which move forward faster than the vehicle speed and which can more significantly retard vehicle motion, shielding the upper wheel surfaces against headwinds is particularly beneficial. Since drag forces upon the wheel are generally proportional to the square of the effective wind speed thereon, and the additional drag on the wheel—and thereby on the vehicle—increases rapidly with headwinds, shielding these upper surfaces greatly reduces the power required to propel the vehicle. Moreover, the relative effectiveness of shielding upper wheel surfaces generally increases with increasing headwinds.

Figure 11:
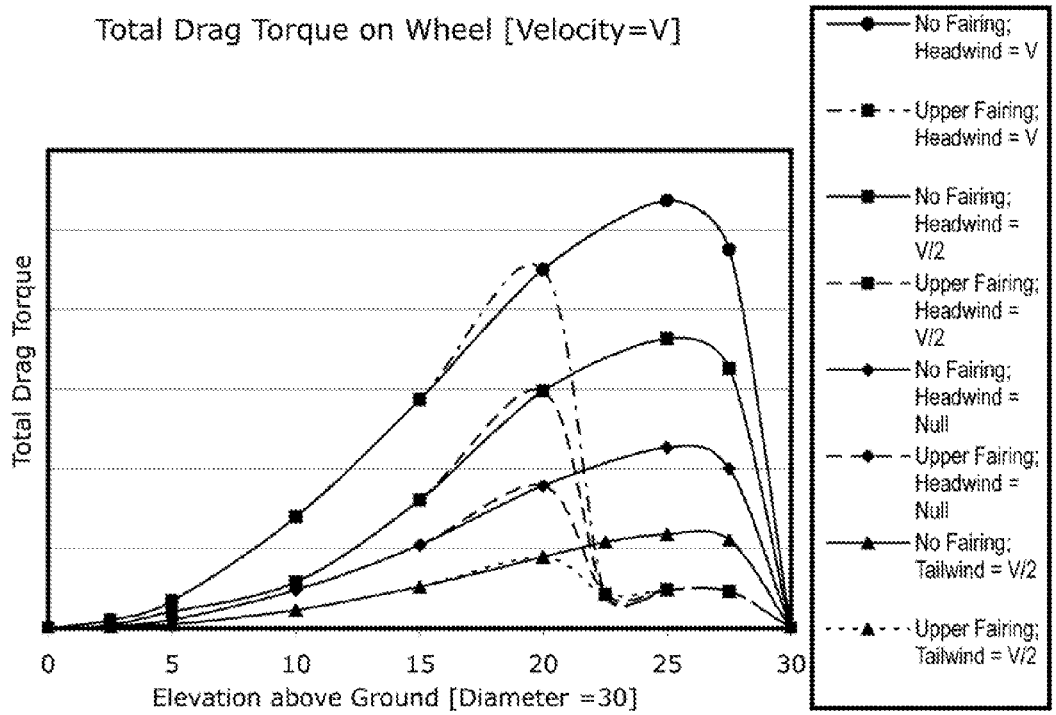
FIG. 11 shows a plot of calculated relative drag torque exerted upon rotating wheel surfaces as a function of elevation above the ground. The relative total drag torques are determined from the calculated average moments in combination with the chord length at various elevations on a wheel moving at a constant speed of V, for several different wind and wheel-surface shielding conditions. Relative magnitudes in total drag torque about the ground contact point as a function of elevation are plotted for eight conditions: comparing with (dashed lines) and without (solid lines) shielding covering the upper third of wheel surfaces, for tailwinds equal to half the vehicle speed, for null headwinds, for headwinds equal to half the vehicle speed, and for headwinds equal to the vehicle speed. The areas under the plotted curves represent the total torque from frictional drag on wheel surfaces. Comparing the differences in area under the plotted curves reveals the general trend of the upper shield to substantially reduce the total drag torque on the rotating wheel.

An examination of the retarding wind vectors on a rotating wheel can reveal the large magnitude of drag retarding moments upon the uppermost wheel surfaces, relative to the lower wheel surfaces. And an estimate of the frictional drag torque on the wheel can be determined by first calculating the average moments due to drag force vectors at various points—all pivoting about the ground contact point—on the wheel (results shown plotted in FIG. 10), and then summing these moments at various wheel elevations above the ground and plotting the results (FIG. 11). The area under the resulting curve (shown in FIG. 11 as a series of curves representing various headwind conditions) then represents the total frictional drag (absent profile drag) torque upon the wheel.

In order to determine the relationship between this torque and elevation on the wheel, the magnitudes of the drag wind vectors that are orthogonal to their corresponding moment arms pivoting about the point of ground contact must first be determined. These orthogonal vector components can be squared and then multiplied by the length of their corresponding moment arms, in order to determine the relative moments due to drag at various points along the wheel rim.

The orthogonal components of these wind vectors tend to increase linearly with elevation for points on the rim of the wheel, and also for points along the vertical mid-line of the wheel. Calculating the moments along the vertical mid-line of the wheel can yield the minimum relative drag moments at each elevation. Calculating an average of the maximum drag moment at the rim combined with the minimum drag moment along the mid-line can then yield the approximate average drag moment exerted at each elevation upon the wheel. Multiplying this average drag moment by the horizontal rim-to-rim chord length can yield an estimate of the drag torque exerted upon the wheel at each elevation level (FIG. 11). These calculations are simply determined from the geometry of the rotating wheel; the object of this analysis is to determine the likely relative magnitudes of drag torques upon the wheel at various elevations.

From the resulting plots (FIG. 11), it can be estimated that the uppermost approximate one-third section of the wheel likely contributes most of the overall drag torque upon the wheel. Thus, by shielding this upper section from headwinds, drag torque can be considerably reduced. With upper-wheel shielding, as noted above, the relative winds beneath the shield are due mostly to wheel rotation, and are generally directed tangentially to the wheel. The resulting drag torque under the shielded sections can then be determined as above, and compared with the unshielded drag torque for similar headwind conditions.

These calculations—generally confirmed by tests—indicate a substantial reduction in retarding drag torque upon the shielded upper wheel surfaces. In the absence of external headwinds, the plots of FIG. 11 indicate that shielding the uppermost approximate one-third section of the wheel can reduce the drag torque of this section considerably, by as much as 75 percent. Moreover, repeating calculations and testing with an external headwind equal to the vehicle speed indicates that upper wheel shielding can reduce the comparative upper wheel drag torque of this section by still more, perhaps by as much as 90 percent. Hence, the potential effectiveness of shielding upper wheel surfaces can be significant, especially with surfaces having higher drag sensitivities, such as wheel spoke surfaces.

As discussed above, since upper wheel drag forces are leveraged against the axle—thereby magnifying the propulsive counterforce required at the axle—an increase in drag force on the wheels generally retards vehicle motion much more rapidly than does an increase in other vehicle drag forces. And while under external headwind conditions, the total drag on a vehicle with wheels exposed directly to headwinds increases still more rapidly with increasing vehicle speed.

Shielding upper wheel surfaces effectively lowers the elevation of the point on the wheel where the effective net drag force is exerted, thereby diminishing the magnifying effect of the propulsive counterforce required at the axle, as discussed above. As a result, the reduction in drag force upon the vehicle achieved by shielding the upper wheel surfaces is comparatively even more significant with increasing external headwinds. Shielding these upper wheel surfaces can thereby improve relative vehicle propulsion efficiency under headwinds by an even greater margin than under null wind conditions.

Moreover, shielding these upper wheel surfaces can be particularly beneficial to spoked wheels, as round spokes can have drag sensitivities many times greater than that of more streamlined surfaces. As round spokes—in some configurations—can have drag coefficients ranging from one to two orders of magnitude greater than corresponding smooth, streamlined surfaces, shielding the spokes of the upper wheel from external wind becomes particularly crucial in reducing overall drag upon the wheel.

Accordingly—given these multiple factors—a relatively small streamlined fairing attached to the vehicle structure and oriented to shield the upper surfaces of the wheel assembly from oncoming headwinds substantially reduces drag upon the wheel, while minimizing total drag upon the vehicle. Consequently, an embodiment includes the addition of such a fairing to any wheeled vehicle—including vehicles having spoked wheels, where the potential drag reduction can be even more significant.

The addition of such minimal fairings to each side of a traditional spoked bicycle wheel, for example, reduces windage losses and improves propulsive efficiency of the bicycle, particularly at higher cycle speeds or in the presence of headwinds, while minimizing cycle instability due to crosswind forces. Since crosswinds are a significant factor restricting the use of larger wheel covers, minimizing the fairing size is also an important design consideration. And minimizing form drag induced by the forward-facing profile of the fairing also will influence the fairing design. The preferred fairing size will likely substantially cover the upper section of the exposed wheel, and be placed closely adjacent to the wheel surfaces, consistent with general use in bicycles. In heavier or powered cycles, design considerations may permit somewhat larger fairings, covering even more of the wheel surfaces.

As shielding upper wheel surfaces can reduce overall drag on the vehicle, while simultaneously augmenting the total frontal profile area of the vehicle exposed to headwinds, a natural design constraint emerges from these competing factors: Shields should be designed sufficiently streamlined and positioned sufficiently close to wheel surfaces to provide reduced overall vehicle drag. And as shielding effectiveness potentially increases under headwind conditions, shields designed with larger surface areas and larger frontal profiles may still provide reduced overall vehicle drag under headwind conditions, if not under null wind conditions. Thus, a range of design criteria may be applied to selecting the best configuration and arrangement of the fairing, and will likely depend on the particular application. In any particular application, however, the embodiment will include a combination of design factors discussed above that will provide a reduction in overall vehicle drag.

In a cycle application, for example, fairings positioned within the width of the fork assembly will likely provide the most streamlined design which both shields spokes from headwinds but also minimizes any additional form drag profile area to the vehicle frame assembly. In other applications, insufficient clearances may preclude positioning the fairings immediately adjacent to moving wheel surfaces. In such situations, headwinds may be sufficient in magnitude to cause a reduction in overall vehicle drag to justify the use of wider upper wheel fairings—positioned largely outside the width of the fork assembly—with extended forward profile areas.

Furthermore, from the previous analysis a consideration the drag torque curves wholly above the level of the axle, it becomes apparent that shielding the wheel is best centered about an elevation likely between 75 and 80 percent of the diameter of the wheel, or near the center of the area under the unshielded torque curve shown in FIG. 18. While drag forces are generally greatest in magnitude near the top of the wheel, the effective exposed topmost surface areas are much smaller, thereby limiting the magnitude of drag torques upon the uppermost surfaces of the wheel. Thus, the upper wheel fairing would best extend above and below this critical level (generally, between 75 and 80 percent of the diameter of the wheel) in order to optimally minimize drag upon the wheel. And as the surfaces forward of the axle are the first to be impacted by headwinds, shielding these surfaces is essential to deflecting headwinds from the rearward surfaces. Thus, the higher-sensitivity drag-inducing surfaces in the forward upper quadrant and centered about this critical elevation on the wheel generally need to be shielded for optimal minimization of drag. These higher-sensitivity drag-inducing surfaces generally centered about this critical elevation and extending to include those surfaces with higher drag-inducing sensitivities that are positioned mostly in the forward upper quadrant of the wheel, but likely also to include much of the wheel surfaces positioned in the rearward upper quadrant, are herein defined and later referred to as: major upper drag-inducing surfaces. And the critical level about which the major drag-inducing surfaces are generally centered in elevation is herein defined and later referred to as: critical elevation.

As discussed, the precise elevation about which the major upper drag-inducing surfaces are centered, as well as the precise extent to which surfaces in the forward quadrant and in the upper half of the wheel central structure are included in the major upper drag-inducing surfaces, will depend on the particular application and operating conditions. Certain wheel surfaces with higher drag sensitivities, such as wheel spokes, generally need to be shielded when positioned within the region of the major upper drag-inducing surfaces. Other surfaces such as smooth tire surfaces having lower drag sensitivities may also benefit from shielding if their surface areas are extensive, are positioned near the critical level in elevation, or are the primary upper wheel surfaces exposed to headwinds. In the example analysis of FIGS. 10 and 11, a uniform surface across the wheel having a constant drag-sensitivity was assumed. In any particular application, the unique combination of different wheel surfaces with differing drag sensitivities will determine the particular height of the critical elevation level about which the major upper drag-inducing surfaces are centered.

A similar analysis can be performed for form drag forces on the moving forward vertical profiles of the wheel rim or tire. The results obtained are generally similar in form, though may differ somewhat in magnitudes as the effective wind speeds on the moving profiles are generally lower on the upper wheel—equal to the vehicle speed—and will depend on the particular application, including the total area of the wheel forward profile exposed to headwinds, and to headwind and vehicle speeds. Nevertheless, the net pressure drag torque caused by the moving outline of the wheel is also centered above the level of the axle, and thereby merits consideration in determining the particular height of the critical elevation level, and in the ultimate configuration of the fairing.

Hence, the fairing shown in FIG. 9 is best configured to shield the uppermost and forward wheel surfaces, and to extend rearward to at least partially shield the forward profile of the trailing portion of the upper wheel rim, consistent with the further requirement to extend downward as much as practical to the level of the axle. As mentioned, crosswind considerations will also influence the ultimate configuration for a particular application.

In consideration of further embodiments described below, the operating principles described above will generally apply, and may be referred thereto.

Present Embodiment

Figure 1:
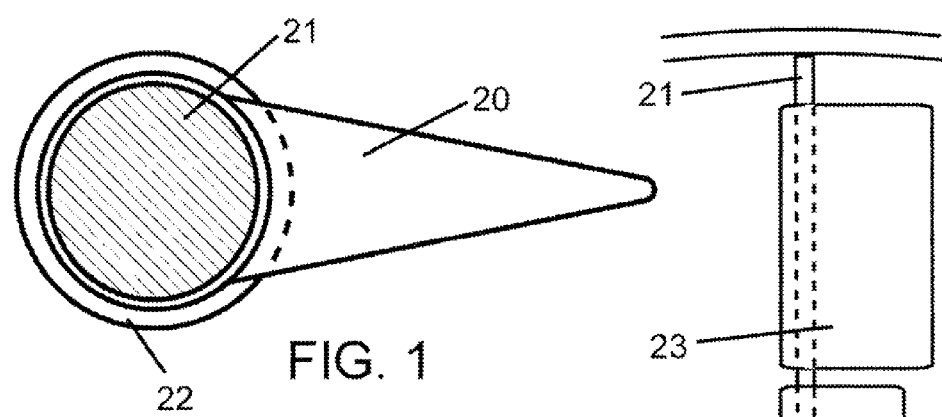
FIG. 1 shows the tapered, drag-reducing cross-sectional profile of a spoke tailfin installed on a typical round wire spoke, where the spoke tailfin is free to swivel about the spoke and thereby to adjust to varying crosswind influences as the wheel rotates.
Figure 2:
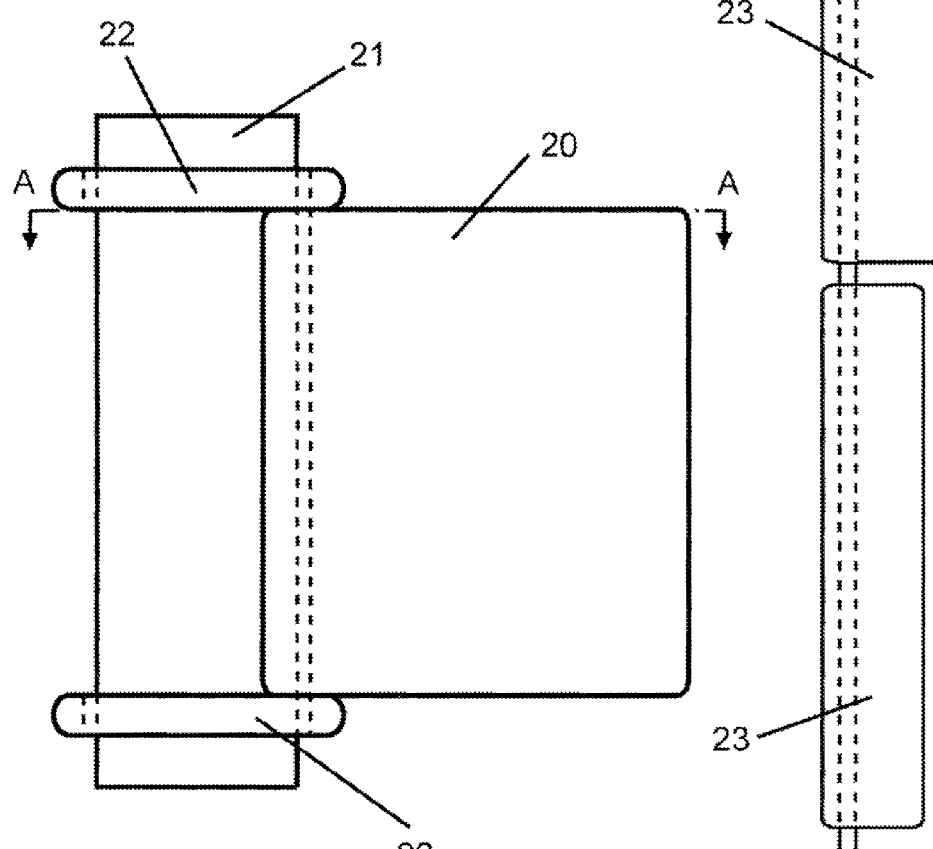
FIG. 2 shows a short section of the tapered, drag-reducing tailfin installed on a typical round wire spoke, where the spoke tailfin is free to swivel about the spoke and thereby to adjust to varying crosswind influences as the wheel rotates.
Figure 3:
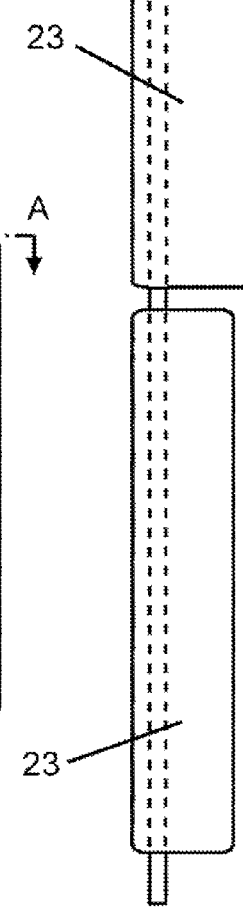
FIG. 3 shows several spoke tailfins installed on a typical round wire spoke, where each spoke tailfin is free to swivel about the spoke independently, and thereby to adjust to varying crosswind influences as the wheel rotates.

Description—FIGS. 1, 2 and 3

In FIG. 1, a streamlined spoke tailfin 20 is installed over a round wire spoke 21—shown in cross-section A-A of FIG. 2—typically used on a cycle. Pivoting rings 22 affixed to tailfin 20 enable tailfin 20 to swivel about the spoke 21, and thereby permitting tailfin 20 to automatically adjust its orientation in response to varying crosswinds. In FIG. 2, the wider profile of the spoke tailfin 20 is shown rotatably attached to spoke 21. In FIG. 3, several spoke tailfin covers 23 of different sizes—shown in the configuration of a cover but similar in streamlined profile to tailfin 20 shown in FIG. 1—are shown installed on a spoke 21. The tailfin cover 23 includes a through-hole containing spoke 21 within its length, enabling the tailfin cover 23 to swivel about spoke 21, and thereby permitting tailfin cover 23 to automatically adjust its orientation in response to varying crosswinds.

Present Embodiment

Operation—FIGS. 1, 2 and 3

The streamlined profile of the swiveling spoke tailfin may offer greatly reduced drag over round spokes, without the potential increase in drag sensitivity of bladed spokes exposed to crosswinds. Use of the streamlined spoke tailfin may reduce drag sensitivity of the round spoke considerably, in some instances by up to a factor of 10.

Eliminating crosswind turbulence upon the streamlined profile is essential to minimize drag on the spokes under crosswind conditions. The relative crosswind-to-headwind vector directed on a point on the wheel varies significantly with wheel rotation. Near the top of the wheel, headwinds are strongest, and any relative crosswinds are less significant. Near the bottom of the wheel, headwinds are minimized and crosswinds are thereby more significant relative sources of drag on the wheel surfaces. Allowing the spoke tailfin to swivel enables the tailfin to adjust to immediate relative crosswinds, which can vary continually with the rotation of the wheel.

The spoke tailfin can be designed either to extend the entire length of the spoke, or to extend over only a portion of the spoke, such as over the outermost section of the spoke nearest the rim, which moves fastest near the top of the wheel, and is thereby exposed to the fastest headwinds.

Alternatively, the spoke tailfins may be divided in several independent sections along the length of the spoke, allowing independent adjustment to the varying crosswind components along the radial direction of the wheel. And these tailfin sections can be different in both size and configuration, to best minimize drag, as shown in FIG. 3. For example, tailfin sections nearest the rim—at the top in FIG. 3—are exposed to the faster headwinds and may be designed for more extensive streamlining, while sections closer to the hub—at the bottom in FIG. 3—being exposed to slower headwinds and greater relative crosswind vector components, may be designed more compactly for more rapid re-orientation. Or the tailfin could be configured with a tapered cross-sectional profile similar in form to the tapered spoke embodiment, described below and referenced in FIGS. 4, 5, 6, 7 and 8, which varies along its entire length. This tailfin design could also be used on a vehicle radio antenna, reducing drag and thereby improving fuel consumption for vehicles, especially when operating at highway speeds.

While shielding the spokes with a fairing is an effective means of reducing drag due to headwinds, drag induced solely from winds due to wheel rotation remains largely unaffected. Indeed, the spokes on the lower half of the wheel are relatively less affected by headwinds, and are more affected by the vector components of wind due to wheel rotation. Using streamlined spoke tailfins, drag on the lower spokes can also be reduced. Moreover, swiveling spoke tailfin covers used in conjunction with upper wheel fairings can offer significant reduction in overall drag upon the wheel—and thereby on the vehicle—while minimizing sensitivity to crosswinds.

CONCLUSIONS, RAMIFICATIONS, AND SCOPE

Exposed wheels can generate considerable drag forces on a moving vehicle. These forces are directed principally near the top of the wheel, rather than being more evenly distributed across the entire profile of the wheel. Moreover, these upper-wheel drag forces are levered against the axle, thereby magnifying the counterforce required to propel the vehicle. As a result, a reduction in drag upon the upper wheel generally enhances propulsive efficiency significantly more than a corresponding drag reduction on other parts of the vehicle.

With the net drag forces being offset and directed near the top of the wheel, nearly equivalent countervailing reaction forces—also opposing vehicle motion—are necessarily transmitted to the wheel at the ground. These reaction forces necessitate augmented down-forces to be applied in higher speed vehicles, in order to maintain static frictional ground contact and, thereby, vehicle traction and directional stability. As wings and other means typically used to augment these down-forces in such vehicles can add significant drag, it becomes evident that substantial effort should be made to reduce the upper wheel drag forces on most high-speed vehicles.

Drag can be reduced on the narrow round spokes of bicycle wheels, by simply adding a streamlined tailfin section to the leeward side of the spoke. By enabling the streamlined tailfin to swivel about the spoke in response to varying crosswinds, drag can be minimized over a variety of crosswind conditions over the full range of wheel rotation. And several tailfins of varying configurations can be used in combination to optimize drag on the spoke, in response to variable crosswinds along the length of the spoke on the upper wheel.

The embodiment should not be limited to the specific examples illustrated and described above, but rather to the appended claims and their legal equivalents.

I claim:

1. An apparatus for reducing the net vehicle propulsory counterforce required to countervail drag-induced forces upon a terrestrial vehicle employing a spoked wheel assembly exposed to headwinds impinging thereon above the level of an axle of said wheel assembly when the vehicle is in forward motion, comprising:

a streamlined spoke tailfin disposed in longitudinal rotatable attachment proximally adjacent to a structural spoke wherein the structural spoke fastening an outer rim to a central hub of a vehicle wheel assembly;

the tailfin disposed lengthwise adjacent to the spoke wherein the tailfin may swivel freely about the longitudinal axis of the spoke in response to winds from varying directions impinging thereon;

the tailfin disposed in streamlined orientation to be thicker near a longitudinal side located proximally adjacent to the spoke and to be substantially thinner at an opposite longitudinal side located furthest from the spoke;

the tailfin employed on the spoke disposed for reduced drag on the spoke from a headwind impinging thereon when the tailfin is positioned directly above the axle in a most elevated position within an upper region of said wheel assembly comprising a major upper drag-inducing surface of said wheel assembly located wholly above the level of the axle, with said region comprising the primary vehicle-drag-inducing wheel surface of said wheel assembly;

the tailfin in the most elevated position extending downwards from the level of a critical elevation which is centered around the primary vehicle-drag-inducing wheel surface; and the tailfin in the most elevated position extending above the level of the critical elevation, whereby the tailfin in the most elevated position can reduce an upper wheel drag force from the headwind or from a crosswind impinging on the spoke.

2. The apparatus of claim 1, further comprising said spoke tailfin varying in streamlined shape from a longer fin-like cross-sectional profile proximate to an end for attachment near the rim of said wheel assembly to a shorter fin-like cross-sectional profile near an opposite end for attachment toward the central hub of said wheel assembly.

3. The apparatus of claim 1, further comprising said spoke tailfin disposed in a plurality of said tailfins on said spoke.

4. The apparatus of claim 1, further comprising:

the tailfin in the most elevated position reducing the upper wheel drag force, whereby the effective traction of said wheel assembly where contacting against the ground is increased and whereby the upper wheel drag force on the spoke being applied higher on said wheel assembly near the level of the critical elevation than a propulsive counterforce being applied lower on said wheel assembly at the axle, and having a mechanical advantage over the propulsive counterforce since both the upper wheel drag force and the propulsive counterforce are levered in opposition about the same lowermost stationary point of ground contact on said wheel assembly with the moment arm of the upper wheel drag force being longer than the moment arm of the propulsive counterforce, a reduction in the upper wheel drag force on the spoke by the tailfin at said elevated position located in the vicinity of the primary vehicle-drag-inducing wheel surface, which also has stronger effective headwinds impinging thereon, is magnified by the mechanical advantage.

5. The apparatus of claim 1, further comprising the vehicle wherein the vehicle is a cycle.

6. The apparatus of claim 1, further comprising the vehicle wherein the vehicle is a bicycle.

7. An apparatus for reducing drag upon a vehicle employing a spoked wheel assembly exposed to headwinds or crosswinds impinging thereon above the level of an axle of said wheel assembly, comprising:

a streamlined spoke tailfin disposed in longitudinal rotatable attachment proximally adjacent to a round structural spoke wherein the structural spoke fastening an outer rim to a central hub of a vehicle wheel assembly;

the tailfin disposed lengthwise adjacent to the spoke wherein the tailfin may swivel freely about the longitudinal axis of the spoke in response to winds from varying directions impinging thereon;

the tailfin disposed in streamlined orientation to be thicker near a longitudinal side located proximally adjacent to the spoke and to be substantially thinner at an opposite longitudinal side located furthest from the spoke; and the tailfin providing reduced drag on the spoke from a headwind impinging thereon when the tailfin is positioned directly above the axle in a most elevated position, whereby drag on the spoke can be reduced by the tailfin in both headwinds and crosswinds.

8. The apparatus of claim 7, further comprising said spoke tailfin varying in streamlined shape from a longer fin-like cross-sectional profile proximate to an end for attachment near the rim of said wheel assembly to a shorter fin-like cross-sectional profile near an opposite end for attachment toward the central hub of said wheel assembly.

9. The apparatus of claim 7, further comprising said spoke tailfin disposed in a plurality of said tailfins on said spoke.

10. The apparatus of claim 7, further comprising the vehicle wherein the vehicle is a cycle.

11. The apparatus of claim 7, further comprising the vehicle wherein the vehicle is a bicycle.

12. In combination, a vehicle wheel assembly comprising a round structural spoke fastening an outer rim to a central hub of said wheel assembly and a means for reducing the drag upon the spoke in either headwinds or crosswinds by said means rotating about the spoke in response to winds from varying directions impinging thereon and reducing the air flow separation behind the trailing surfaces of the spoke positioned immediately adjacent to said means.

13. The means of claim 12, wherein said wheel assembly is a cycle wheel.

14. The means of claim 12, wherein said wheel assembly is a bicycle wheel.

* * * * *